(12) United States Patent
Choi et al.

(10) Patent No.: US 10,844,767 B2
(45) Date of Patent: Nov. 24, 2020

(54) DEVICE AND METHOD FOR REMOVING CARBON FROM OXYGEN SENSOR

(71) Applicants: HYUNDAI MOTOR COMPANY, Seoul (KR); KIA MOTORS CORPORATION, Seoul (KR)

(72) Inventors: Yong Jun Choi, Suwon-si (KR); Sung Jong Oh, Suwon-si (KR); Sung Moon Cho, Hwaseong-si (KR); Yun Sik Jang, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/400,546

(22) Filed: May 1, 2019

(65) Prior Publication Data
US 2020/0149457 A1 May 14, 2020

(30) Foreign Application Priority Data
Nov. 13, 2018 (KR) .................. 10-2018-0139245

(51) Int. Cl.
*F01N 9/00* (2006.01)
*F02D 41/14* (2006.01)

(52) U.S. Cl.
CPC ........... *F01N 9/00* (2013.01); *F02D 41/1494* (2013.01); *F01N 2240/16* (2013.01);
(Continued)

(58) Field of Classification Search
CPC .. F01N 9/00; F01N 2240/16; F01N 2560/025; F01N 2560/20; F01N 2900/1404; F02D 41/1494; F02D 41/1495; F02D 41/1455; F02D 41/1456; F02D 41/029; F02D 41/0295; F02D 41/0055
(Continued)

(56) References Cited

U.S. PATENT DOCUMENTS 7,143,756 B2 * 12/2006 Kojima ................. F01N 3/0814
123/698
7,555,895 B2 * 7/2009 Shirakawa .......... F02D 41/1495
60/285
(Continued)

FOREIGN PATENT DOCUMENTS

JP 06242063 A * 9/1994
JP 09274008 A * 10/1997
(Continued)

*Primary Examiner* — Thai Ba Trieu
(74) *Attorney, Agent, or Firm* — McDonnell Boehnen Hulbert & Berghoff LLP

(57) ABSTRACT

The present disclosure relates to a device and a method for removing a carbon from an oxygen sensor. The device may include an oxygen sensor installed in a gas exhaust line of a vehicle to measure an oxygen content in an exhaust gas, a valve for transferring a high-pressure air flow to the oxygen sensor, a valve actuator for driving the valve, and a controller for controlling the valve actuator to open the valve when an abnormality occurs in the oxygen sensor. When the abnormality has occurred in the oxygen sensor, the valve for transferring the high-pressure air flow is opened, and a temperature of zirconia provided in the oxygen sensor is raised to remove a carbon deposited on the oxygen sensor.

18 Claims, 8 Drawing Sheets

(52) U.S. Cl.
CPC .... *F01N 2560/025* (2013.01); *F01N 2560/20* (2013.01); *F01N 2900/10* (2013.01); *F01N 2900/1404* (2013.01)

(58) Field of Classification Search
USPC .................... 60/295, 280, 285; 123/698–699
See application file for complete search history.

(56) References Cited

U.S. PATENT DOCUMENTS

| | | | | |
|---|---|---|---|---|
| 2007/0012342 A1* | 1/2007 | Stansilaw | ............. | B08B 9/0321 |
| | | | | 134/169 A |
| 2010/0186377 A1* | 7/2010 | Shibata | .................. | F01N 9/002 |
| | | | | 60/286 |
| 2011/0011378 A1* | 1/2011 | Nakamura | .......... | F02D 41/1495 |
| | | | | 123/568.16 |
| 2013/0173145 A1* | 7/2013 | Yasuda | ................. | F02D 41/009 |
| | | | | 701/113 |
| 2018/0163656 A1* | 6/2018 | Jang | .......................... | F01N 9/00 |
| 2018/0274488 A1* | 9/2018 | Martin | ............... | F02M 25/0222 |
| 2019/0024566 A1* | 1/2019 | Nishizawa | ............ | F01N 11/002 |
| 2019/0195153 A1* | 6/2019 | Dudar | ................. | F02D 41/1448 |

FOREIGN PATENT DOCUMENTS

| | | |
|---|---|---|
| JP | 2011-185097 A | 9/2011 |
| KR | 2003-0015486 A | 2/2003 |
| KR | 2009-0049195 A | 5/2009 |
| KR | 2018-0068168 A | 6/2018 |

* cited by examiner

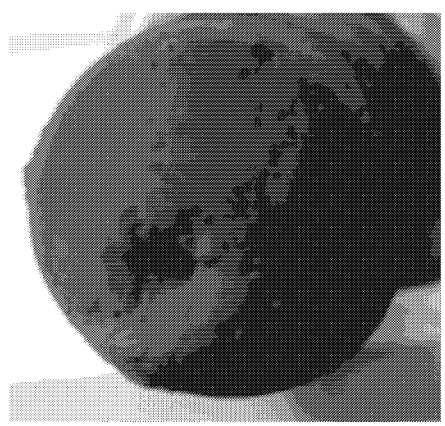 
FIG.6A                    FIG.6B

DEVICE AND METHOD FOR REMOVING CARBON FROM OXYGEN SENSOR

CROSS-REFERENCE TO RELATED APPLICATION

This application claims the benefit of priority to Korean Patent Application No. 10-2018-0139245, filed in the Korean Intellectual Property Office on Nov. 13, 2018, the entire contents of which are incorporated herein by reference.

TECHNICAL FIELD

The present disclosure relates to a device and a method for removing a carbon deposited on an oxygen sensor.

BACKGROUND

An exhaust gas discharged from a vehicle's engine contains various harmful substances such as hydrocarbon (HC), carbon monoxide (CO), nitrogen oxide ($NO_x$), and the like. Thus, an exhaust manifold is equipped with various types of catalysts that purify these harmful substances to stabilize an emission.

As an exhaust gas regulation for a diesel engine has been strengthened, an LNT (Lean $NO_x$ Trap) catalyst where an NSC ($NO_x$ Storage Catalyst) is applied to reduce nitrogen oxide ($NO_x$) has been applied. The LNT catalyst is constituted by a $NO_x$ adsorber-catalyst and a DOC (diesel oxidation catalyst) in one carrier.

In one example, an LNT system performs a post-injection logic to purify the nitrogen oxide. In this connection, an oxygen sensor (also called a lambda sensor) is required to perform the post-injection logic.

In particular, the oxygen sensor located at a front end of the LNT may be exposed to a harsh environment such as a high temperature exhaust gas, smoke, THC (Total Hydrocarbon), and the like such that a carbon may be easily deposited. The carbon thus deposited on the oxygen sensor causes a response delay of the oxygen sensor to deteriorate a performance of the oxygen sensor.

Conventionally, when the performance deterioration due to the carbon deposited on the oxygen sensor occurs, a mechanic had to remove the oxygen sensor from the vehicle, then remove the carbon. Thus, there was an inconvenience to a driver.

SUMMARY

The present disclosure solves the above-mentioned problems while maintaining the device's advantages.

An aspect of the present disclosure provides a device and a method for removing a carbon when an abnormality has occurred in an oxygen sensor, deposited on the oxygen sensor by opening a valve that transfers a high-pressure air flow to the oxygen sensor.

Further, an aspect of the present disclosure provides a device and a method for removing a carbon when an abnormality has occurred in an oxygen sensor, deposited on the oxygen sensor by raising a temperature of zirconia provided in the oxygen sensor.

Further, an aspect of the present disclosure provides a device and a method for removing a carbon when an abnormality has occurred in an oxygen sensor, deposited on the oxygen sensor by opening a valve for transferring a high-pressure air flow to the oxygen sensor, and by raising a temperature of zirconia provided in the oxygen sensor.

The technical problems to be solved by the present disclosure are not limited to the aforementioned problems, and any other technical problems not mentioned herein will be clearly understood from the following description by those skilled in the art to which the present disclosure pertains. Further, it will be easily understood that the objects and advantages of the present disclosure may be realized by means of the means set forth in the claims and combinations thereof.

According to an aspect of the present disclosure, a device for removing a carbon includes an oxygen sensor installed in a gas exhaust line of a vehicle to measure an oxygen content in an exhaust gas, a valve for transferring a high-pressure air flow to the oxygen sensor, a valve actuator for driving the valve, and a controller for controlling the valve actuator to open the valve when an abnormality occurs in the oxygen sensor.

According to an aspect of the present disclosure, the controller may monitor a response-performance of the oxygen sensor to detect the abnormality based on a response delay.

According to an aspect of the present disclosure, the controller may determine that the response delay has occurred when a time period required for a value measured by the oxygen sensor to reach a reference value exceeds a reference time range.

According to an aspect of the present disclosure, the controller may determine that the response delay has occurred when a time period required for a value measured by the oxygen sensor to reach a reference value exceeds a reference time.

According to an aspect of the present disclosure, the device may further include storage for storing a normal response-performance curve representing an intrinsic property of the oxygen sensor and an error response-performance curve due to a carbon deposited on the oxygen sensor.

According to an aspect of the present disclosure, the controller may determine, based on the normal response-performance curve, the error response-performance curve, and a measurement response-performance curve of the oxygen sensor, whether the response delay has occurred in the oxygen sensor.

According to an aspect of the present disclosure, the controller may respectively calculate a size of a first area defined between the normal response-performance curve and the measurement response-performance curve in an effective time period and a size of a second area defined between the measurement response-performance curve and the error response-performance curve in the effective time period. When a ratio between the first area and the second area sizes exceeds a reference value, the controller may determine that the response delay has occurred in the oxygen sensor.

According to an aspect of the present disclosure, the controller may generate the measurement response-performance curve of the oxygen sensor a reference number of times. Then, the controller may generate the reference number of ratios between the first area and second area sizes, and calculate an average between the reference number of ratios. When the average exceeds the reference value, the controller may determine that the abnormality has occurred in the oxygen sensor.

According to an aspect of the present disclosure, the controller may set an opening degree and an opening time period of the valve.

According to an aspect of the present disclosure, the device may further include a heater for heating the oxygen sensor. The controller may operate the heater when the abnormality occurs in the oxygen sensor.

According to an aspect of the present disclosure, a method for removing a carbon includes measuring, by an oxygen sensor installed in a gas exhaust line of a vehicle, an oxygen content in an exhaust gas, detecting, by a controller, an abnormality of the oxygen sensor, and opening, by the controller, a valve for transferring a high-pressure air flow to the oxygen sensor.

According to an aspect of the present disclosure, the detecting of the abnormality of the oxygen sensor may include monitoring a response-performance of the oxygen sensor and detecting the abnormality based on a response delay.

According to an aspect of the present disclosure, the detecting of the abnormality of the oxygen sensor may include determining that the response delay has occurred in the oxygen sensor when a time period required for a value measured by the oxygen sensor to reach a reference value exceeds a reference time range.

According to an aspect of the present disclosure, the detecting of the abnormality of the oxygen sensor may include determining that the response delay has occurred in the oxygen sensor when a time period required for a value measured by the oxygen sensor to reach a reference value exceeds a reference time.

According to an aspect of the present disclosure, the method may further include storing, by storage, a normal response-performance curve representing an intrinsic property of the oxygen sensor and an error response-performance curve due to a carbon deposited on the oxygen sensor.

According to an aspect of the present disclosure, the detecting of the abnormality of the oxygen sensor may include determining, based on the normal response-performance curve, the error response-performance curve, and a measurement response-performance curve of the oxygen sensor, whether the response delay has occurred in the oxygen sensor.

According to an aspect of the present disclosure, the detecting of the abnormality of the oxygen sensor may include respectively calculating a size of a first area defined between the normal response-performance curve and the measurement response-performance curve in an effective time period and a second area defined between the measurement response-performance curve and the error response-performance curve in the effective time period, and determining that the response delay has occurred in the oxygen sensor when a ratio between the first area and the second area exceeds a reference value.

According to an aspect of the present disclosure, the detecting of the abnormality of the oxygen sensor may include generating the measurement response-performance curve of the oxygen sensor a reference number of times, generating the reference number of ratios between the first area and second area sizes, calculating an average between the reference number of ratios, and when the average exceeds the reference value, determining that the abnormality has occurred in the oxygen sensor.

According to an aspect of the present disclosure, the opening of the valve may include setting an opening degree and an opening time period of the valve.

According to an aspect of the present disclosure, the opening of the valve may include operating a heater for heating the oxygen sensor.

BRIEF DESCRIPTION OF THE DRAWINGS

The above and other objects, features and advantages of the present disclosure will be more apparent from the following detailed description taken in conjunction with the accompanying drawings:

FIG. 6 shows a performance of a device for removing a carbon from an oxygen sensor according to an embodiment of the present disclosure;

DETAILED DESCRIPTION

Figure 1:
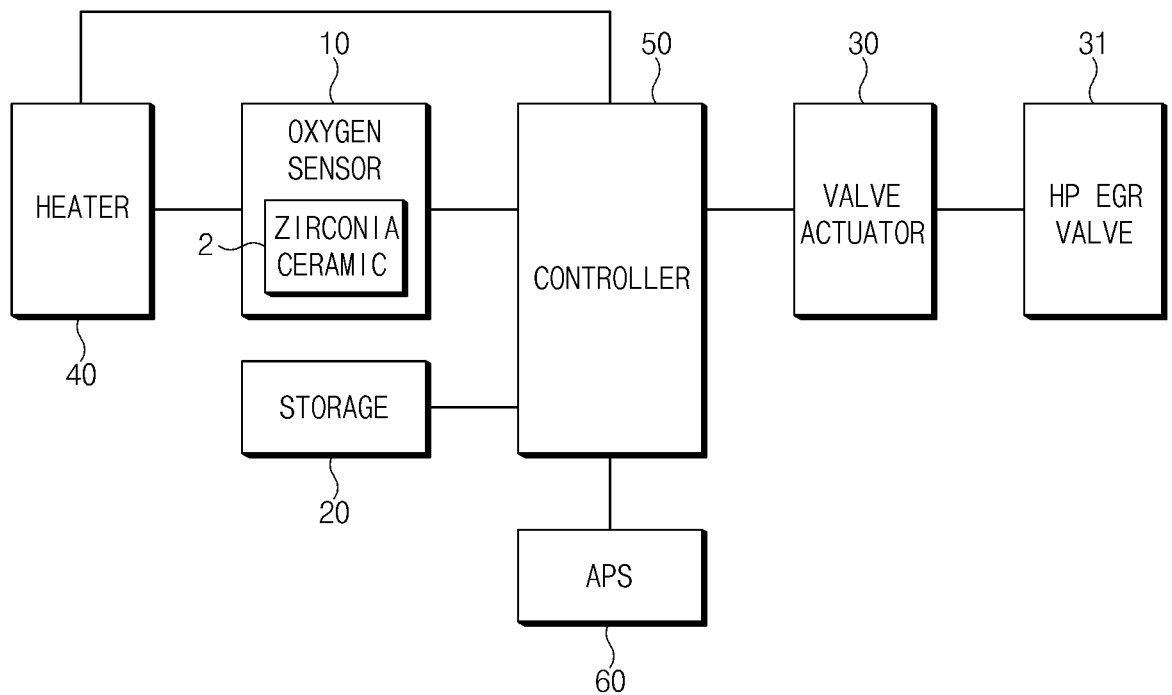
FIG. 1 is a schematic diagram illustrating a device for removing a carbon from an oxygen sensor according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In an embodiment of the present disclosure, the present disclosure is described using an HP (High-pressure) EGR (Exhaust Gas Re-circulation) valve 31 as an example. However, the present disclosure is not limited thereto.

FIG. 1 is a schematic diagram illustrating a device for removing a carbon from an oxygen sensor according to an embodiment of the present disclosure.

As shown in FIG. 1, a device 100 for removing a carbon from an oxygen sensor according to an embodiment of the present disclosure may include an oxygen sensor 10, storage 20, a valve actuator 30, the HP EGR valve 31, a heater 40, and a controller 50. In one example, components may be combined with each other based on a manner for realizing a device for removing a carbon from an oxygen sensor, and some components may be omitted based on a manner for realizing the present disclosure.

Regarding each of the components, first, the oxygen sensor 10 is installed in a gas exhaust line of a vehicle to measure an oxygen content (%) in an exhaust gas. The oxygen sensor 10 is also referred to as a lambda sensor because the oxygen sensor 10 detects a lambda (λ). In this connection, the lambda (λ) means an excess air ratio representing a ratio between an amount of an air required to completely combust a fuel and an amount of the air actually supplied. Theoretically, when the fuel is completely combusted, a value of the lambda (λ) becomes 1. In one example, the oxygen sensor 10 may have a structure as shown in FIG. 2.

Figure 2:
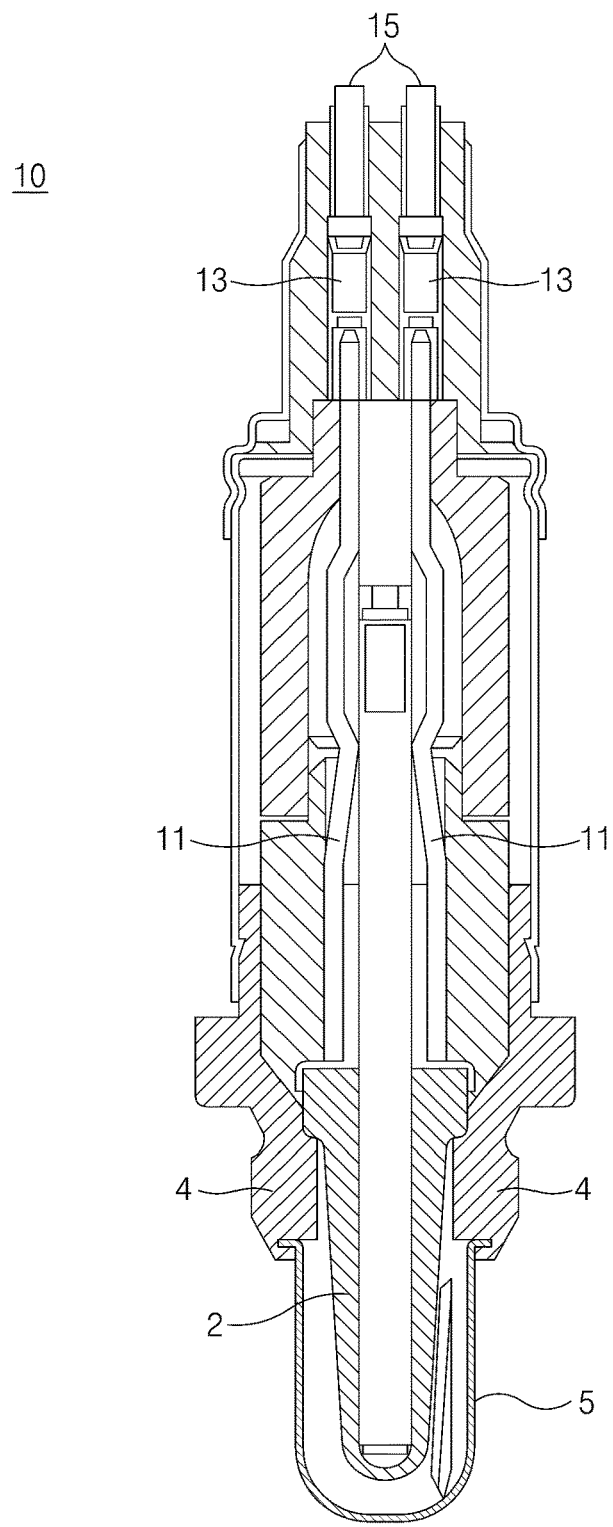
FIG. 2 is an example of a structure of an oxygen sensor used in the present disclosure.

FIG. 2 is an example of a structure of an oxygen sensor used in the present disclosure.

As shown in FIG. 2, in the oxygen sensor 10 used in the present disclosure, an inner cable 11 is connected to a zirconia (ZrO2) ceramic 2 which outputs a voltage value based on a difference of an oxygen concentration between an exhaust gas and an external air. In addition, the inner cable 11 is connected to an outer cable 15 which is connected to an electronic control module (not shown) by a terminal 13. A metal gasket 4 for sealing the ceramic 2 from the outside is placed on an outer side of the ceramic 2. In addition, a tube 5 for protecting the ceramic 2 is attached to a tip of the metal gasket 4. That is, the voltage value (oxygen content) output from the zirconia ($ZrO_2$) ceramic 2 based on the oxygen concentration difference between the exhaust gas and the external air is input to the electronic control module (ECM). Then, the electronic control module controls an injector based on the voltage value to adjust an air-fuel ratio between a mixer entering in to an engine, and adjust a spark timing.

In the present disclosure, the oxygen sensor 10 may have any structure as long as it has the zirconia ceramic that may be heated.

Next, the storage 20 may store various logics, algorithms, and programs required to open the HP EGR valve 31 for removing a carbon deposited on the oxygen sensor 10 when an abnormality occurs in the oxygen sensor 10.

In addition, the storage 20 may store various logics, algorithms, and programs required to raise a temperature of the zirconia provided in the oxygen sensor 10 for removing a carbon deposited on the oxygen sensor 10 when the abnormality occurs in the oxygen sensor 10.

In addition, the storage 20 may store various logics, algorithms, and programs required to open the HP EGR valve 3, and raise the temperature of the zirconia provided in the oxygen sensor 10 for removing the carbon deposited on the oxygen sensor 10.

Figure 3:
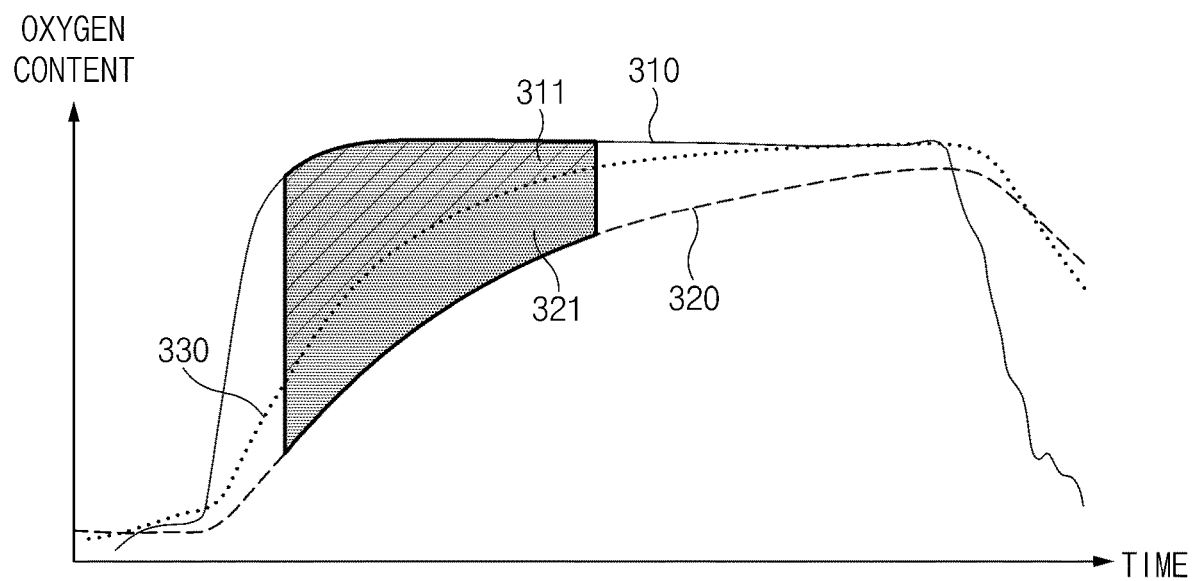
FIG. 3 shows a normal response-performance curve and an error response-performance curve of an oxygen sensor according to an embodiment of the present disclosure.

In addition, the storage 20 may further store a normal response-performance curve representing an intrinsic property of the oxygen sensor 10 and an error response-performance curve representing a maximum response delay of the oxygen sensor 10, as shown in FIG. 3. In this embodiment, the maximum response delay means a response delay of the oxygen sensor 10 which may be maximized by the carbon deposited on the oxygen sensor 10.

FIG. 3 shows a normal response-performance curve and an error response-performance curve of an oxygen sensor according to an embodiment of the present disclosure.

In FIG. 3, '310' represents the normal response-performance curve, '320' represents the error response-performance curve, and '330' represents a response-performance curve (hereinafter referred to as a measurement response-performance curve) of the oxygen sensor 10 measured by the controller 50.

In FIG. 3, '311' represents an area defined between the normal response-performance curve 310 and the measurement response-performance curve 330 in a critical time period (response time period). Further, '321' represents an area defined between the measurement response-performance curve 330 and the error response-performance curve 320 in the critical time period.

In addition, the storage 20 may include at least one type of a storage medium of at least one type of a memory such as a flash memory type, a hard disk type, a micro type, and a card type (for example, an SD card (Secure Digital Card) or an XD card (eXtream Digital Card)) memory, and the like, and a RAM (Random Access Memory), a SRAM (Static RAM), a ROM (Read Only Memory), a PROM (Programmable ROM), an EEPROM (Electrically Erasable PROM), an MRAM (Magnetic RAM), a magnetic disk, and an optical disk type memory.

The valve actuator 30 is an actuator (in one example, a motor) for actuating the HP EGR valve 31. The valve actuator 30 actuates the HP EGR valve 31 under control of the controller 50. That is, the valve actuator 30 opens or closes the HP EGR valve 31.

Next, the HP EGR valve 31 transfers a high-pressure air flow to the oxygen sensor 10.

An effect of an opening degree of the HP EGR valve 31 on the oxygen sensor 10 will be described in further detail with respect to FIGS. 4 and 5.

Figure 4:
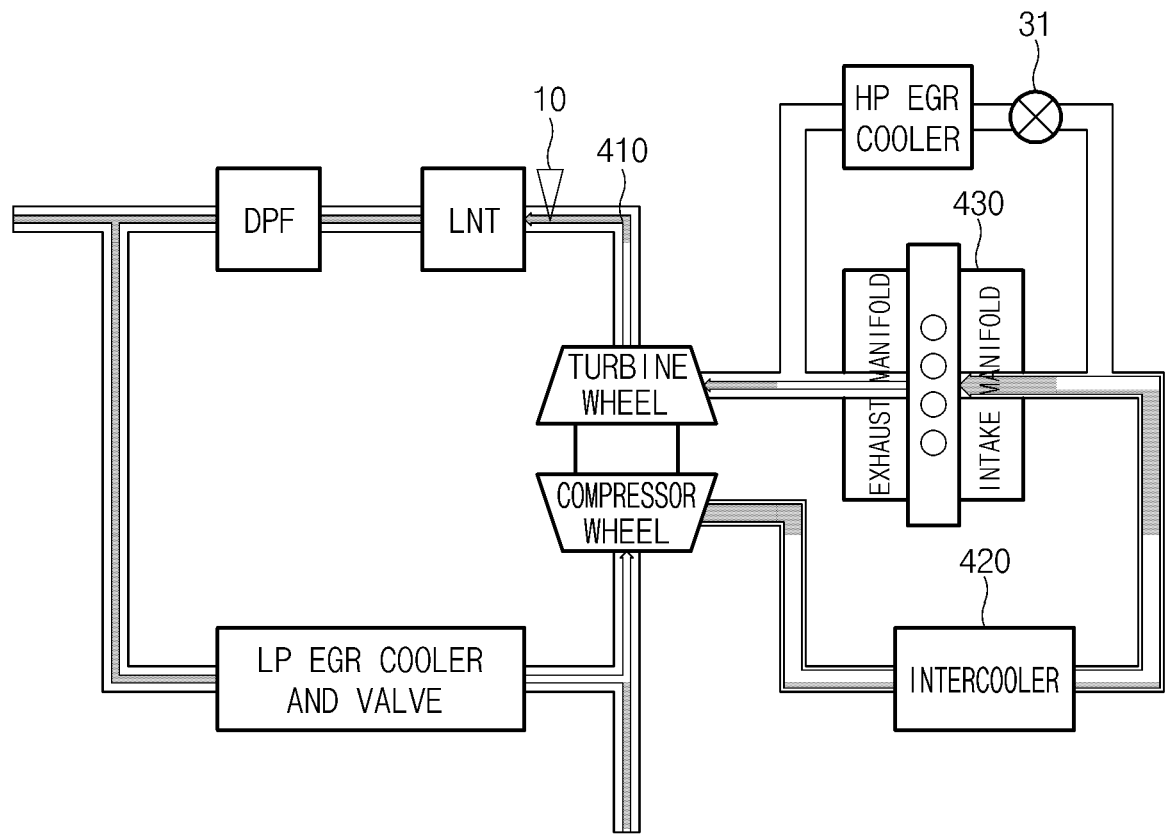
FIG. 4 shows an air flow to-be-transferred to an oxygen sensor when a device for removing a carbon from an oxygen sensor according to an embodiment of the present disclosure closes an HP EGR valve.

FIG. 4 shows an air flow to-be-transferred to an oxygen sensor when a device for removing a carbon from an oxygen sensor according to an embodiment of the present disclosure closes an HP EGR valve.

As shown in FIG. 4, when the HP EGR valve 31 is closed by the controller 50, an air from an intercooler 420 is weakened by an intake manifold 430, and an air flow to-be-transferred to the oxygen sensor 10 is reduced. Thus, the carbon deposited on the oxygen sensor 10 may not be removed. In this connection, '410' represents the air flow to-be-transferred to the oxygen sensor 10.

Figure 5:
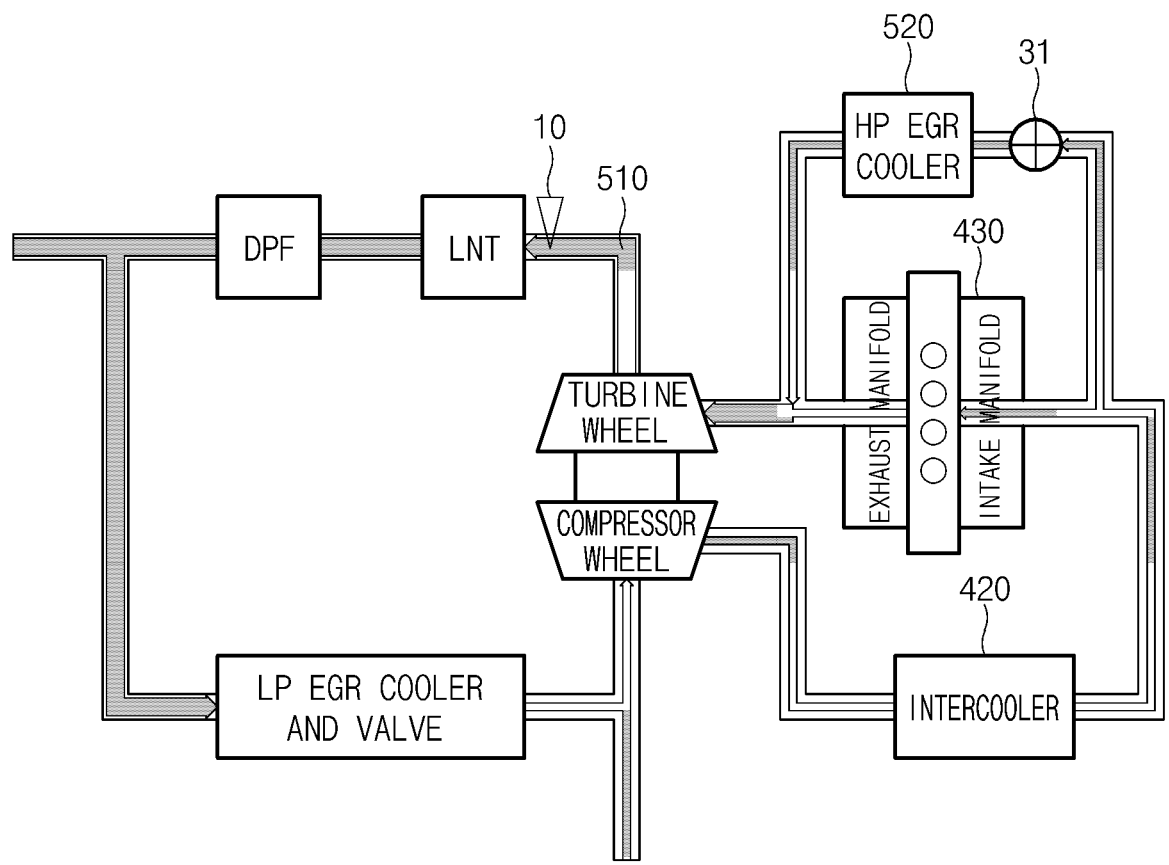
FIG. 5 shows an air flow to-be-transferred to an oxygen sensor when a device for removing a carbon from an oxygen sensor according to an embodiment of the present disclosure opens an HP EGR valve.

FIG. 5 shows an air flow to-be-transferred to an oxygen sensor when a device for removing a carbon from an oxygen sensor according to an embodiment of the present disclosure opens an HP EGR valve.

As shown in FIG. 5, when the HP EGR valve 31 is opened by the controller 50, the air from the intercooler 420 enters an HP EGR cooler 520 via the HP EGR valve 31. Then, the air that has passed through the HP EGR cooler 520 joins the air that has passed through the intake manifold 430. As a result, a high-pressure air flow is transferred to the oxygen sensor 10, thereby removing the carbon deposited on the oxygen sensor 10. In this connection, '510' represents the air flow to-be-transferred to the oxygen sensor 10. It is desirable that the opening of the HP EGR valve 31 is performed when a driver does not press an accelerator pedal.

As a result, the HP EGR valve 31 is opened about 50% with the driver not pressing the accelerator pedal, so that the high-pressure air flow may be transferred to the oxygen sensor 10, thereby removing the carbon deposited on the oxygen sensor 10.

Then, the heater 40 heats the zirconia ceramic provided in the oxygen sensor 10. At this time, the heater 40 may heat the zirconia ceramic to a temperature of about 950° C. to 1000° C.

Additionally, the zirconia collectively refers to as zirconium oxide. The zirconium oxide is an oxide of zirconium, and a white crystal. This zirconia has a high melting point of about 2,700° C., and thus has a high corrosion resistance.

Next, the controller 50 performs an overall control such that each of the components may perform a function thereof normally. This controller 50 may be embodied in the form of hardware or software, or a combination thereof. Preferably, the controller 50 may be a microprocessor, but is not limited thereto.

In addition, the controller 50 executes instructions to open the HP EGR valve 31 when the abnormality occurs in the oxygen sensor 10.

In addition, the controller 50 executes instructions to raise the temperature of the zirconia provided in the oxygen sensor 10 when the abnormality occurs in the oxygen sensor 10.

In addition, the controller 50 executes instructions to open the HP EGR valve 31, and raise the temperature of the zirconia provided in the oxygen sensor 10 when the abnormality occurs in the oxygen sensor 10.

The controller 50 may also control operation of the oxygen sensor 10. That is, the controller 50 activates the oxygen sensor 10 to monitor the response-performance of the oxygen sensor 10, thereby detecting a performance abnormality based on the response delay of the oxygen sensor 10.

Hereinafter, three manners in which the controller 50 detects the abnormality of the oxygen sensor 10 will be described.

In a first example, when a time period (a time period required for a value measured by the oxygen sensor 10 to reach 21% from 0%) it takes for a value measured by the oxygen sensor 10 to reach a reference value (for example, 21%) exceeds a reference time range (for example, 2.5 sec to 7.5 sec), the controller 50 may determine that an abnormality has occurred in the oxygen sensor 10.

Additionally, when the oxygen sensor 10 is activated by the controller 50, the measurement of the oxygen content in the exhaust gas is started. In this connection, the measured value which was 0% at first becomes gradually increasing with time. The oxygen content is measured until the measured value no longer increases. That is, the oxygen sensor 10 delivers, to the controller 50, the oxygen content continuously measured until a final oxygen content is measured. Accordingly, the controller 50 may count the period of time required for the value measured by the oxygen sensor 10 to reach from 0% to 21%.

For example, the oxygen sensor 10 may deliver the initial 0% to the controller 50, then 7% to the controller 50. Thereafter, the oxygen sensor 10 may deliver 10%, 14%, 19%, 21%, 15%, and 28% (the final oxygen content) sequentially to the controller 50. Thus, the controller 50 may count the period of time required for the oxygen content measured by the oxygen sensor 10 to reach from 0% to 21%.

In a second example, the controller 50 may detect the abnormality of the oxygen sensor 10 based on the time period required for the measured value to reach the reference value in a plurality of zones.

1) When the time period (the time period required for the value measured by the oxygen sensor 10 to become 6.3% from 0%) required for the value measured by the oxygen sensor 10 to reach a reference value (for example, 6.3%) exceeds a first reference time (for example, 3.5 seconds), the controller 50 may determine that the abnormality has occurred in the oxygen sensor 10.

2) When the time period (the time period required for the value measured by the oxygen sensor 10 to become 12.6% from 0%) required for the value measured by the oxygen sensor 10 to reach a reference value (for example, 12.6%) exceeds a second reference time (for example, 5 seconds), the controller 50 may determine that the abnormality has occurred in the oxygen sensor 10.

3) When the time period required for the value measured by the oxygen sensor 10 to reach from the first reference value to the second reference value exceeds a third reference time (for example, 1.7 seconds), the controller 50 may determine that the abnormality has occurred in the oxygen sensor 10.

In a third example, the controller 50 may detect the abnormality of the oxygen sensor 10 based on the normal response-performance curve 310 and the error response-performance curve 320 stored in the storage 20, and the measurement response-performance curve 330 of the oxygen sensor 10.

First, the controller 50 activates the oxygen sensor 10 and monitors the operation of the oxygen sensor 10 to generate the measurement response-performance curve 330 of the oxygen sensor 10.

Thereafter, the controller 50 calculates a size of the first area 311 defined between the normal response-performance curve 310 and the measurement response-performance curve 330 in the effective time period, and also calculates a size of the second area 321 defined between the measurement response-performance curve 330 and the error response-performance curve 320 in the effective time period.

Thereafter, when a ratio between the sizes of the first area 311 and the second are 312 (a result of dividing the first area size by the second area size) exceeds a reference value (for example, 0.83), the controller 50 may determine that the abnormality has occurred in the oxygen sensor 10. In this embodiment, the controller 50 may generate the measurement response-performance curve 330 of the oxygen sensor 10 a reference number of times (for example, three times) for improving an accuracy, and calculate the sizes of the first area 311 and the second area 321 corresponding to each number of times. Then, when an average of results of dividing the size of the first area 311 by the size of the second are 321 exceeds the reference value, the controller 50 may determine that the abnormality has occurred in the oxygen sensor 10.

In one example, upon determining that the abnormality has occurred in the oxygen sensor 10, the controller 50 controls the valve actuator 30 such that the HP EGR valve 31 is opened by a reference value (e.g., 50%). The controller 50 counts an opening time period of the HP EGR valve 31 such that the opening time period of the HP EGR valve 31 does not exceed 30 minutes, as an example. A next opening time of the HP EGR valve 31 is preferably after 1,000 km of traveling.

In addition, upon determining that the abnormality has occurred in the oxygen sensor 10, the controller 50 may control the heater 40 such that the temperature of the zirconia provided in the oxygen sensor 10 reaches a reference value (for example, 950° C. to 1000° C.). In this example, the controller 50 controls the heater 40 such that the time elapsed at which the temperature of the zirconia is at the reference value does not exceed 30 minutes, for example. A next heating time is preferably after 1,000 km of traveling.

In addition, upon determining that the abnormality has occurred in the oxygen sensor 10, the controller 50 may control the valve actuator 30 such that the HP EGR valve 31 is opened by the reference value (for example, 50%), and may also control the heater 40 such that the temperature of the zirconia provided in the oxygen sensor 10 reaches the reference value (for example, 950° C. to 1000° C.).

In one example, when a condition for determining that the abnormality has occurred in the oxygen sensor 10 is resolved, the controller 50 may terminate the logic (a control of the HP EGR valve 31 and a temperature control of the oxygen sensor 10) for removing the carbon from the oxygen sensor 10.

In addition, the controller 50 is connected to a vehicle network such that various vehicle information may be collected. To this end, the vehicle information may include an Accelerator Position Sensor (APS) value. In addition, the vehicle network includes a CAN (Controller Area Network), an LIN (Local Interconnect Network), a FlexRay, an MOST (Media Oriented Systems Transport), and the like.

In addition, it is preferable that the controller 50 opens the HP EGR valve 31 by 50% when the APS (Accelerator Position Sensor) 60 value is 0, that is, when the driver does not press the accelerator pedal.

FIG. 6 shows a performance of a device for removing a carbon from an oxygen sensor according to an embodiment of the present disclosure.

FIG. 6A illustrates that when an engine is run for 130 hours without application of the present disclosure, a large amount of carbon is deposited on the oxygen sensor 10.

FIG. 6B illustrates that when an engine is run for 130 hours with the present disclosure applied, a small amount of carbon is deposited on the oxygen sensor 10 as compared to FIG. 6A.

Figure 7:
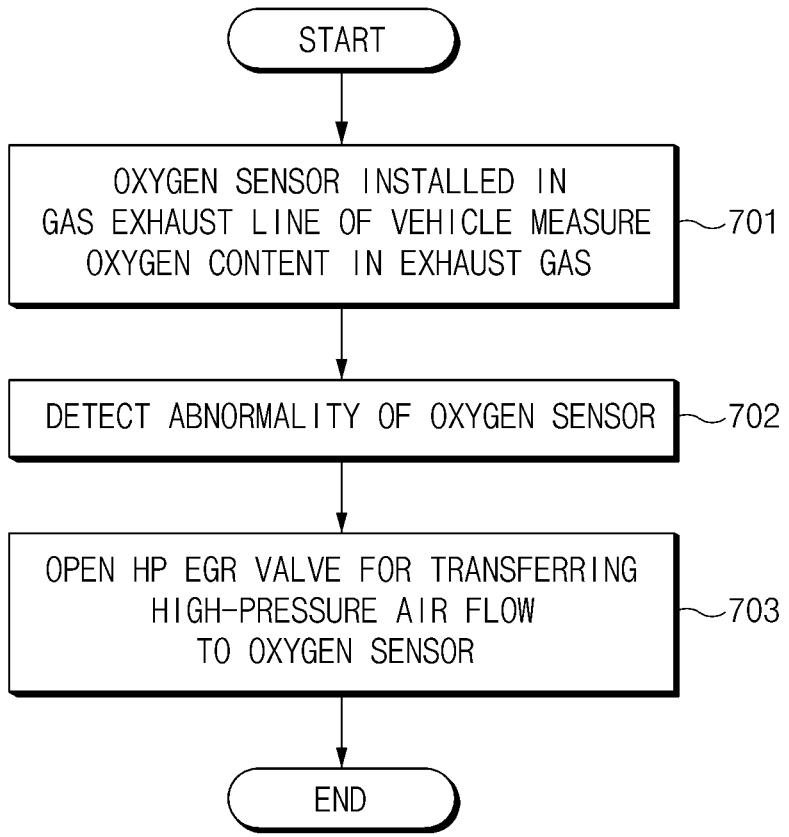
FIG. 7 is a flow chart of a method for removing a carbon from an oxygen sensor according to an embodiment of the present disclosure.

FIG. 7 is a flow chart of a method for removing a carbon from an oxygen sensor according to an embodiment of the present disclosure.

First, the oxygen sensor 10 installed in the gas exhaust line of the vehicle measures the oxygen content in the exhaust gas (701).

Thereafter, the controller 50 detects the abnormality of the oxygen sensor 10 (702). That is, the controller 50 may detect the response delay due to the carbon deposited on the oxygen sensor 10.

Thereafter, the controller 50 opens (703) the HP (High-pressure) EGR (Exhaust Gas Re-circulation) valve 31 that transfers the high-pressure air flow to the oxygen sensor 10. In this connection, it is desirable that the controller 50 opens the HP EGR valve 31 without the driver stepping on the accelerator pedal.

Figure 8:
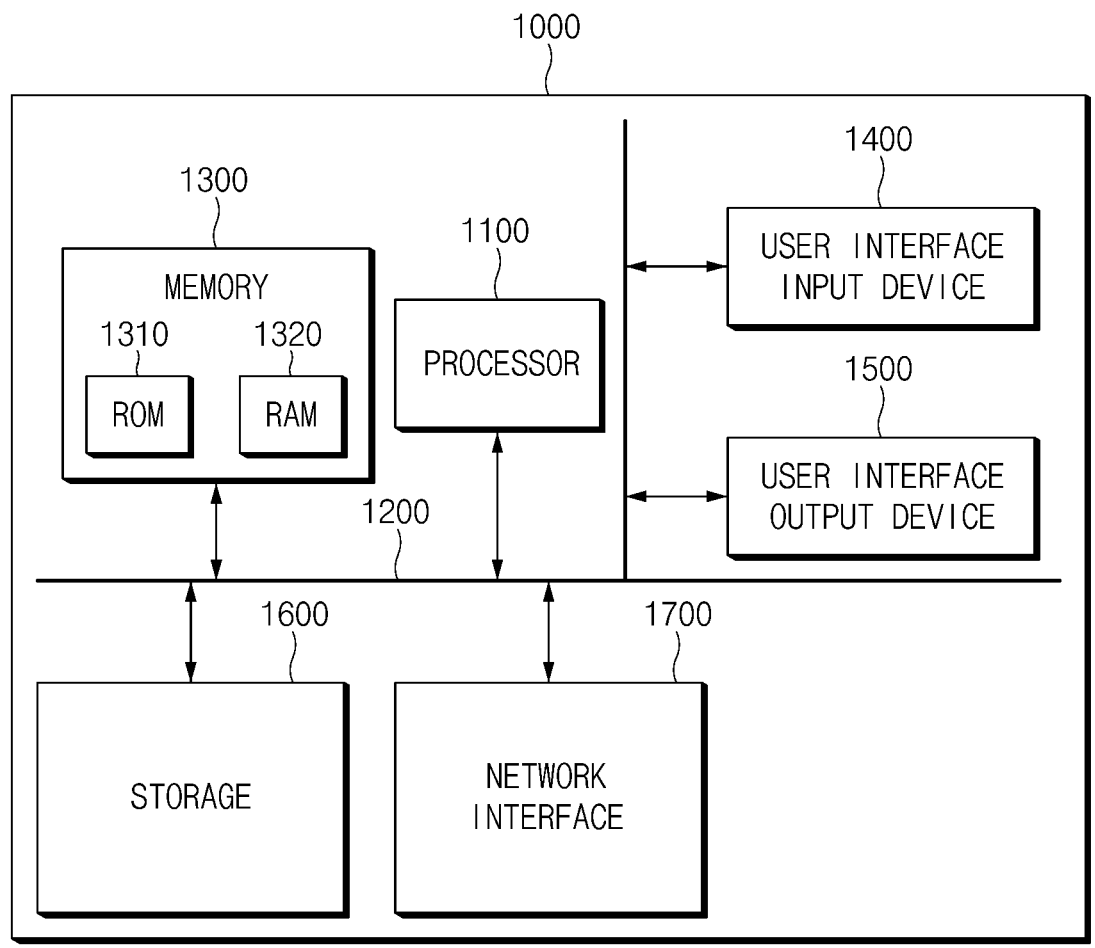
FIG. 8 is a block diagram illustrating a computing system for performing a method for removing a carbon from an oxygen sensor according to an embodiment of the present disclosure.

FIG. 8 is a block diagram illustrating a computing system for performing a method for removing a carbon from an oxygen sensor according to an embodiment of the present disclosure.

With reference to FIG. 8, the method for removing a carbon from an oxygen sensor according to an embodiment of the present disclosure described above may also be implemented via the computing system. A computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

A device and a method for removing a carbon from an oxygen sensor according to an embodiment of the present disclosure may, when an abnormality has occurred in the oxygen sensor, open a valve for transferring a high-pressure air flow to the oxygen sensor, and raise a temperature of zirconia provided in the oxygen sensor such that a carbon deposited on the oxygen sensor may be removed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for removing carbons, the device comprising:
an oxygen sensor installed in a gas exhaust line of a vehicle to measure an oxygen content in an exhaust gas during an operation condition of an engine;
a high pressure exhaust gas recirculation (EGR) valve;
a valve actuator for actuating the high pressure exhaust gas recirculation (EGR) valve; and
a controller including a central processor programmed with executable instructions stored in a non-transitory readable medium to:
determine an occurrence of an abnormality of the oxygen sensor; and control the valve actuator to open the high pressure exhaust gas recirculation (EGR) valve to remove carbon deposited on the oxygen sensor when the abnormality occurs in the oxygen sensor.

2. The device of claim 1, wherein the controller further comprising executable instructions to monitors a response-performance of the oxygen sensor to determine the abnormality based on a response delay of the oxygen sensor.

3. The device of claim 2, further comprising:
at least one of a reference time and a range to a reference time is predetermined in the controller;
wherein the controller further comprises executable instructions to determines the response delay has occurred in a time period required for a value measured by the oxygen sensor to reach a reference value exceeding a reference time range.

4. The device of claim 2, further comprising
a storage configured for storing a normal response-performance curve representing an intrinsic property of the oxygen sensor and an error response-performance curve due to the carbons deposited on the oxygen sensor.

5. The device of claim 4, wherein the controller further comprises executable instructions to determine, based on the normal response-performance curve, the error response-performance curve, and a measurement response-performance curve of the oxygen sensor, whether the response delay has occurred in the oxygen sensor.

6. The device of claim 5, wherein the controller further comprises executable instructions to:
determine a size of a first area defined between the normal response-performance curve and the measurement response-performance curve in an effective time period;
determine a size of a second area defined between the measurement response-performance curve and the error response-performance curve in the effective time period; and
set a ratio between the first area size and second area size and
determine the response delay having occurred in the oxygen sensor based on the ratio between the first area size and the second area size exceeding a reference value.

7. The device of claim 6, wherein the controller further comprises executable instructions to:
generate the measurement response-performance curve of the oxygen sensor a reference number of times;
generate the reference number of ratios between the first area and second area sizes;
calculate an average between the reference number of ratios; and
determine the abnormality having occurred in the oxygen sensor based on the average between the reference number of ratios exceeding the reference value.

8. The device of claim 1, wherein the controller further comprising executable instructions to determine an opening degree of the high pressure EGR valve and the time period for opening the high pressure EGR valve.

9. The device of claim 1, further comprising a heater for heating the oxygen sensor,
wherein the controller further comprising executable instructions to operates the heater based on respect to the abnormality having occurred in the oxygen sensor.

10. A method for removing carbons, the method comprising steps of:

measuring, by an oxygen sensor installed in a gas exhaust line of a vehicle, an oxygen content in an exhaust gas during an operating condition of an engine;
detecting, by a controller, an abnormality of the oxygen sensor; and
opening, by the controller, a high pressure exhaust gas recirculation (EGR) valve to remove carbon deposited on the oxygen sensor when an abnormality occurs in the oxygen sensor.

11. The method of claim 10, wherein the step of detecting of the abnormality of the oxygen sensor includes monitoring a response-performance of the oxygen sensor to detect the abnormality based on a response delay of the oxygen sensor.

12. The method of claim 11, wherein the detecting of the abnormality of the oxygen sensor includes determining the response delay having occurred in the oxygen sensor in a time period required for a value measured by the oxygen sensor to reach a reference value exceeding at least one of a reference time and a range of a reference time, which is predetermined in the controller.

13. The method of claim 11, further comprising:
storing, in storage, a normal response-performance curve representing an intrinsic property of the oxygen sensor and an error response-performance curve due to the carbons deposited on the oxygen sensor.

14. The method of claim 13, wherein the step of detecting of the abnormality of the oxygen sensor includes:
determining, based on the normal response-performance curve, the error response-performance curve, and a measurement response-performance curve of the oxygen sensor, whether the response delay has occurred in the oxygen sensor.

15. The method of claim 14, wherein the detecting of the abnormality of the oxygen sensor includes:
determining a size of a first area defined between the normal response-performance curve and the measurement response-performance curve in an effective time period;
determining a second area defined between the measurement response-performance curve and the error response-performance curve in the effective time period;
setting a ratio between the first area size and the second area size; and
determining the response delay having occurred in the oxygen sensor based on respect to the ratio between the first area size and second area size exceeding a reference value.

16. The method of claim 15, wherein the step of detecting of the abnormality of the oxygen sensor includes:
generating the measurement response-performance curve of the oxygen sensor a reference number of times;
generating the reference number of ratios between the first area and second area sizes;
calculating an average between the reference number of ratios; and
determining that the abnormality has occurred in the oxygen sensor based on the respect to the average between the reference number of ratios exceeding the reference value.

17. The method of claim 10, wherein the step of opening of the high pressure EGR valve includes determining an opening degree of the high pressure EGR valve and the time period for opening of the high pressure EGR valve.

18. The method of claim 10, wherein the step of opening of the high pressure EGR valve includes operating a heater for heating the oxygen sensor as the abnormality having occurred in the oxygen sensor.

* * * * *